Patented Sept. 7, 1943

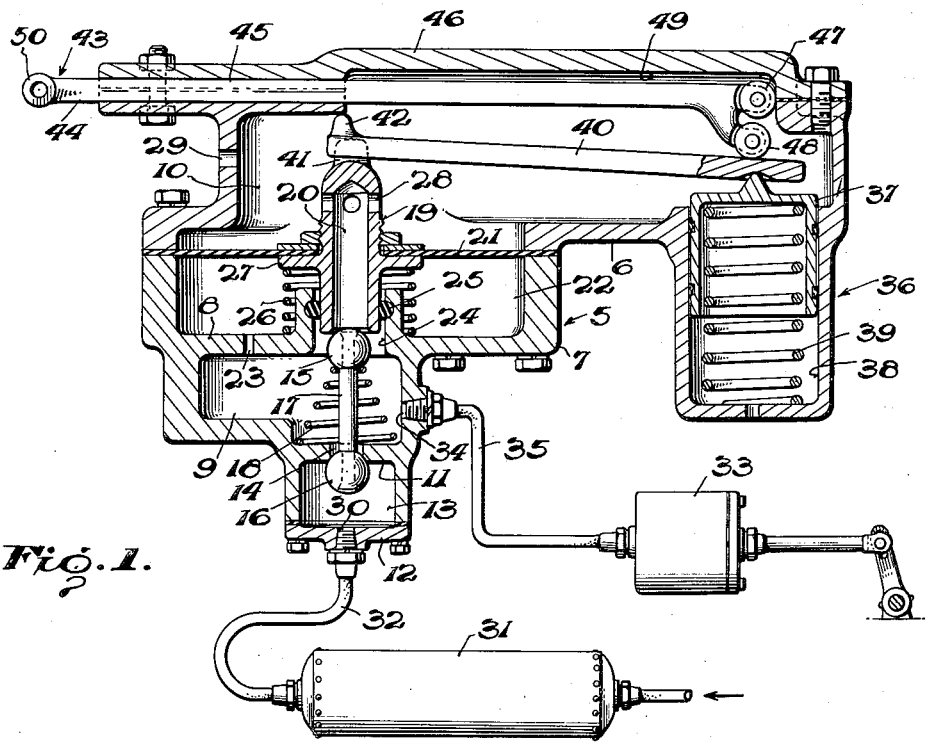

2,329,155

UNITED STATES PATENT OFFICE 2,329,155

BRAKE MECHANISM

Roger H. Casler, Elyria, Ohio, assignor to Bendix-Westinghouse Automotive Air Brake Company, Elyria, Ohio, a corporation of Delaware Application July 7, 1941, Serial No. 401,386

13 Claims. (Cl. 303—54)

This invention relates to control mechanisms and more particularly to a valve mechanism of the so-called self-lapping type for the control of fluid pressure.

It has heretofore been proposed to employ fluid pressure control valve mechanisms having intake and exhaust valves arranged to control the flow of fluid pressure from a source of fluid pressure to an actuator and to control the flow of fluid pressure from the actuator to atmosphere, the operation of these valves being controlled jointly by a member responsive to the pressure in the actuator and by a resilient element such as a spring adapted to be compressed by means of a suitable leverage arrangement to oppose the action of the pressure responsive member in such a manner that the pressure in the actuator is always proportional to the degree of compression of the spring, which is commonly known as a graduating spring. In view of the fact that such springs have been serially connected between the operating lever and the valve operating member which is responsive to the pressure in the actuator, heavy springs have been required for this purpose and a large amount of force is necessary to actuate valves of this type when a high pressure is present in the actuator, with the result that the force which must be exerted on the operator's pedal to obtain this pressure is often excessive, making satisfactory control of the brakes by the operator difficult.

Valves of the above type are commonly known as self-lapping valves, it being well known in the art that with valves of this type, a condition of balance is reached at any desired pressure, determined by the degree of compression of the graduating spring, wherein the intake and exhaust valves are both in closed position and the pressure responsive member always returns to a pre-determined position under these conditions. Due to the necessity for employing relatively heavy graduating springs having a high rate of pick-up however, there has been a tendency for the rate of flow of fluid pressure delivered by such valves to gradually fall off as the self-lapping point is reached, due to the gradual closing of the valves, which action has been detrimental in that it appreciably lengthens the time necessary to supply a given pressure to the fluid actuator. The present invention, however, contemplates a novel arrangement of a resilient means or spring for actuating the valve mechanism in place of the serially connected graduating spring arrangement now commonly used in order to minimize the difficulties encountered with such valves in supplying a desired degree of fluid pressure to a fluid actuator in a minimum period of time.

A further object of the invention is to provide, in a mechanism of this general type, means for controlling the pressure delivered by the valve in such manner as to require a minimum amount of effort on the part of the operator.

Another object of the invention is to provide pressure responsive means under the control of the operator for actuating the valve mechanism, so constituted as to minimize the falling off in the rate of pressure delivery which is characteristic of valves wherein an operator controlled graduating spring is used to actuate the valve mechanism.

These and other objects and novel features of the invention will appear more fully hereinafter from the following detailed description when taken in connection with the accompanying drawing. It is to be expressly understood, however, that the drawing is employed for purposes of illustration only, and is not designed as a definition of the limits of the invention, reference being had for this purpose to the appended claims.

In the drawing, wherein similar reference characters refer to similar parts throughout the several views:

Fig. 1 is a diagrammatic view partially in section, of a fluid pressure control valve mechanism for a fluid pressure system constructed in accordance with the principles of the present invention, and Fig. 2 is a diagrammatic view partially in section, of another embodiment of the invention.

Referring more particularly to Fig. 1, the invention is disclosed therein as embodying a self-lapping valvular mechanism having the left hand portion thereof constructed substantially in accordance with the principles disclosed in the patent to William J. Andres and Roy S. Sanford, No. 2,133,275, issued October 18, 1938. The valve mechanism includes a casing 5 formed of upper and lower sections 6 and 7 respectively, it being understood that the casing may be supported on the motor vehicle for convenient control by the vehicle operator in any suitable manner, not shown. The casing is divided into a plurality of chambers, a partition 8 being provided and forming with said casing an outlet chamber 9 and an exhaust chamber 10. The lower casing member 7 is formed with a partition 11 adapted to define, in connection with the casing and a cover member 12 suitably secured to the lower end of the casing, an intake chamber 13, the partition 11 being provided with a port 14 for connecting the outlet chamber 9 with the inlet chamber 13.

Valve means are provided for controlling the flow of fluid pressure from the intake chamber 13 to the outlet chamber 9, and from the latter to the exhaust chamber 10, and as illustrated, such means are constituted by exhaust and intake valves 15 and 16 respectively, said valves preferably being of spherical form and rigidly connected as by means of a rod 17. A single spring 18 is interposed between the exhaust valve 15 and the upper face of the partition 11 in such a manner as to normally maintain the exhaust and intake valve assembly in the position shown, wherein the intake valve 16 rests against the lower end of the bore 14, thus effectively preventing the flow of fluid pressure from the inlet chamber 13 to the outlet chamber 9.

In order to actuate the valves 15 and 16 for controlling the flow of fluid pressure to the outlet chamber and also for controlling the communication between the outlet chamber and the exhaust chamber, a valve actuating member 19 is utilized which is provided with an axial bore 20 forming an exhaust passage. Suitably secured to the valve plunger 19 is a pressure responsive element 21 constituted by a diaphragm clamped as shown between the upper and lower housing portions 6 and 7, and acting in connection with the casing and the partition 9 to define a diaphragm chamber 22 and subjected to the pressure in the outlet chamber 9 through a choked passage 23 formed in the partition 8. A bore 24 is also formed in a portion of the partition 8 concentric with the plunger 19 and a sealing ring 25 is suitably mounted in said bore for guiding the lower end of the plunger and for preventing the flow of fluid pressure between the chambers 9 and 22 except through the passage 23. The lower end of the bore 20 in the plunger 19 is normally maintained in spaced relationship with the upper surface of the ball valve 15 by means of a spring 26 interposed between a shoulder portion 27 of the plunger and the upper face of the partition 8. In order that the outlet chamber 9 may be normally connected to atmosphere through the bore 20, the upper end of the plunger is provided with ports 28 adapted to establish communication between the bore 20 and the exhaust chamber 10, which chamber in turn communicates with atmosphere through an exhaust port 29 formed in the wall of the casing member 6. It will thus be seen that the portion of the valve mechanism hereinbefore described is substantially similar to that disclosed in the patent to William J. Andres and Roy S. Sanford, above referred to, and in order that this portion of the valve mechanism may be rendered effective for controlling the flow of fluid pressure in a system, the inlet chamber 13 is provided with an inlet port 30 connected with a pressure supply reservoir 31 as by means of a conduit 32, while the outlet chamber 9 is connected with a fluid pressure actuator 33 of any desired type by means of a port 34 and a conduit 35, it being pointed out that with the construction shown, the valves 15 and 16 may be sequentially operated on movement of the plunger 19 to supply fluid pressure from the reservoir 31 to the actuator 33, to maintain fluid pressure in the actuator while disestablishing the connection therebetween and the reservoir 31, or to connect the actuator with atmosphere for the purpose of exhausting fluid pressure therefrom.

Operation of the valve actuating plunger 19 is accomplished by means of a motor 36 comprising an operating element 37 slidably mounted in a bore 38 formed in the right portion of the casing 4 and a compressed spring 39 interposed between the element and the lower end of the bore 38. An operative connection is established between the motor element 37 and the valve plunger 19 by means of a lever 40 mounted in pivotal engagement with the upper end of the element 37 as shown and having its other end in engagement with the upper end of the plunger 19, lateral movement of the lever 40 with respect thereto being prevented by means of suitable guides 41 on the upper end of the plunger, and upward movement of the left end of the lever 40 being limited by means of a stop 42 provided thereon and adapted to engage a portion of the casing member 6. The spring 39 is normally maintained in a precompressed condition through the medium of a movable fulcrum member 43 comprising an operating rod 44 slidably mounted in a bore 45 formed in the upper portion of the casing member 6 and retained in position by means of a cover member 46 suitably attached thereto, the right end of the operating member 43 being provided with rollers 47 and 48 separately pivotally mounted thereon as shown, the upper roller being adapted to travel on a track portion 49 formed on the lower face of the cover member 46 and the lower roller 48 being adapted to roll along the upper surface of the lever 40 on corresponding movement of the rod 44. It will thus be evident that with the parts in the position shown, the right end of the rod 44 is supported against upward movement by engagement of the roller 47 with the track 49, while the spring 39 is maintained in a compressed condition due to the position of the roller 48 substantially in alignment with the pivotal connection between the motor element 37 and the lever 40. It will also be understood that when the center of the roller 48 is in alignment with the center of the motor element 37 there will be no tendency for the force exerted by the spring 39 to cause rotation of the lever 40 about the fulcrum roller 48. It will be seen from the foregoing description that the fulcrum roller 48 may be moved along the lever 40 to any desired position by the operation of the rod 44 through any suitable operator controlled means, not shown, such as a mechanical connection between an operating lever convenient to the vehicle operator and an eye 50 formed at the left end of the operating rod.

In operation and considering the parts to be so adjusted that the intake valve 16 is closed and the lower end of the bore 20 of the plunger 19 is slightly spaced from the upper surface of the exhaust valve 15, movement of the rod 44 and the attached rollers 47 and 48 to the left will establish a fulcrum point at some position along the upper surface of the lever 40, thus causing the force exerted by the spring 39 through the element 37 to rotate the lever 40 thereabout in a counter-clockwise direction, with a consequent tendency to move the valve operating plunger 19 downward, first closing the exhaust valve and subsequently opening the intake valve to admit fluid pressure from the reservoir to the actuator 33 through conduit 32, port 30, intake chamber 13, open intake valve 14, outlet chamber 9, outlet port 34 and conduit 35. On opening of the intake valve in this manner to supply fluid pressure from the reservoir 31 to the actuator, it is evident that the pressure of the fluid in the outlet chamber 9 and in the actuator will subsequently be transmitted to the diaphragm chamber 22 by way of the restricted passage 23, with a resultant upward force being exerted on the diaphragm 21 and through the plunger 19 to overcome the downward force exerted thereon through the lever 40, causing clockwise rotation of the lever 40 about its point of engagement with the fulcrum roller 48 by an amount sufficient to cause compression of the spring 39 to yield a force acting through the lever 40 sufficient to balance the upward force exerted on the plunger 19 by the action of fluid pressure on the diaphragm 21. This action results in closing of the intake valve 16, thus cutting off a further supply of pressure to the outlet chamber 9 and permitting the parts to reach a state of equilibrium in a manner well known in connection with self-lapping control valves of this general type.

It is further noted that with the valves in lapped position, the mechanism is so arranged as to cause the upper surface of the lever 40 to be substantially parallel with the roller track 49, so that the only force necessary to cause motion of the rod 44 to establish a new fulcrum position with relation to the lever 40 is that required to overcome the friction of the rod and of the rollers, the result being that with the valve in lapped position, a new position of the rod 44 can be selected for the establishment of a different pressure of either greater or lesser degree with the use of very little force on the rod itself.

It will also be noted that with the present construction the distance through which the graduating spring must be compressed or decompressed to cause corresponding actuation of the plunger 19 to operate the valves is determined by the position of the fulcrum roller 48 in relation to the lever 40 and to the travel of the plunger 19 necessary to actuate the valves. Since the spring motor acts on the valve plunger 19 with a large mechanical advantage when the fulcrum roller 48 is moved to the extreme left, the force exerted by the spring to obtain maximum delivery pressure corresponding to this position can be comparatively small and the spring may be chosen so as to have a rate of pick-up much lower than that necessary in conventional valve construction, the result being that the change in force upward on the plunger 19 necessary to upset the equilibrium of the leverage system and permit lapping of the valves is comparatively small, so that the intake valve tends to remain open to its fullest extent until a pressure is reached in the diaphragm chamber 22 which is nearly sufficient to cause lapping of the valve mechanism.

It may be desirable under some circumstances to further decrease the pick-up rate of the motor which serves to actuate the valves, and with particular reference to Fig. 2 of the drawing, novel means are provided in a similar valve structure for accomplishing this desirable end. The left hand portion of the casing is provided with valve mechanism, including exhaust and intake valves 15 and 16, a valve operating plunger 19 and a pressure responsive diaphragm 21 in a manner substantially similar to that shown in Fig. 1 of the drawing, the only important difference being in the construction of the motor mounted in the right end of the casing for actuating the valve operating lever 40. In the particular embodiment shown in Fig. 2, the bore 38 formed in the right portion of the casing 36 is provided with a motor element 37 slidably mounted therein and acted on by fluid pressure supplied thereto from the inlet chamber 13 by way of a port 51, the motor element 37 being provided at its lower end with a sealing cup 52 for preventing the escape of fluid pressure past the motor element 37 and into the upper portion of the casing. A stop 53 normally spaced from an extension 54 formed on the lower portion of the element 37 may limit downward movement of the element and the upper end of the element is in pivotal engagement with the lower side of the valve operating lever 40. A slightly different construction is used on the member 43, the right end of the member having a shoe portion 55 formed on its upper surface adapted to slide on the track 49 formed on the upper cover, a fulcrum portion 56 being adapted to move along the upper surface of the lever 40 in order to establish the fulcrum point for the lever at any desired position between the two extremes of movement thereof.

It will thus be apparent that with the reservoir charged with fluid pressure an upward force will be exerted on the motor element 37 due to the action of fluid pressure thereon which will be substantially constant at all times, and that movement of the rod 44 and the fulcrum 56 to the left will cause the motor to impart a counter-clockwise rotation to the lever 40 about the fulcrum point 56 for actuating the valve operating plunger 19 and supplying fluid pressure to the actuator 33 in the manner heretofore described. As the pressure builds up in the fluid actuator and in the diaphragm chamber 22, it will be evident that the upward force acting on the plunger 19 will tend to move it upward to lap the valves and impart clockwise rotation to the lever 40, with consequent downward movement of the motor element 37, but in view of the fact that the lower face of the element is subjected at all times directly to the pressure in the reservoir 31, and due to the relatively large volume of the reservoir, it will be apparent that downward movement of the element 37 will cause very little compression of the fluid pressure acting thereon, and that consequently the pick-up which is characteristic of a spring used in this position will be substantially absent and the intake valve will tend to remain open fully until the force acting upward on the diaphragm 21 due to the pressure in the chamber 22 is sufficient to overbalance the force exerted on the lever 40 by the motor element 37 in response to the pressure supplied thereto from the reservoir 31. While the fluid motor shown for operating the valves is of the piston type, it will be understood that a diaphragm or other equivalent structure can be used if this proves to be desirable.

While two embodiments of the invention have been illustrated and described herein with considerable particularity, it is to be understood that the same are not limited to the form shown but may receive a variety of mechanical expressions as will readily appear to those skilled in the art. Reference will, therefore, be had to the appended claims for a definition of the limits of the invention.

What is claimed is:

1. The combination in a fluid pressure control valve having a casing provided with intake and exhaust valves and a pressure responsive member for controlling the operation of the valves, of a motor of a type producing a substantially constant force for actuating said member, a lever connecting said motor and member, and a movable fulcrum associated with said lever and movable with respect thereto for varying the mechanical advantage thereof.

2. The combination in a fluid pressure control valve having a casing provided with intake and exhaust valves and a pressure responsive member for controlling the operation of the valves, of means for actuating said member including a motor of a type producing a substantially constant force, leverage mechanism for connecting said motor and member, and means movable with respect to said mechanism for varying the mechanical advantage of said leverage mechanism.

3. The combination in a fluid pressure control valve having a casing provided with intake and exhaust valves and a pressure responsive member for controlling the operation of the valves, of means for actuating said member including a pre-compressed spring, a lever having a portion in operative engagement with said spring and another portion in operative engagement with said member, and a fulcrum movable between said portions and cooperating with said lever for varying the mechanical advantage thereof.

4. The combination with a fluid pressure control system including a source of fluid pressure, a fluid pressure actuator, valvular means for controlling the flow of fluid pressure from said source to said actuator, and a member responsive to the pressure in said actuator for controlling the operation of said valvular means, of a fluid motor actuated by the pressure from said source, means for effecting an operative connection between said motor and member, and means cooperating therewith and movable with respect thereto for varying the force applied to said member by the operation of said motor.

5. The combination in a fluid pressure control system including the source of fluid pressure, a fluid actuator, and valvular means for controlling the flow of fluid pressure from said source to said actuator, of means responsive to the pressure in said actuator for controlling the operation of the valvular means in one direction, means responsive to the pressure at said source for controlling the operation of the valvular means in the opposite direction, and means including a movable fulcrum for effecting an operative connection between said pressure responsive means for controlling the pressure delivered to said actuator from said source 6. The combination in a fluid pressure control system including a source of fluid pressure, a fluid actuator, and valvular means for controlling the flow of fluid pressure from said source to said actuator and from said actuator to atmosphere, of means responsive to the pressure in said actuator for controlling the operation of said valvuar means in one direction, means responsive to the pressure at said source for controlling the operation of said valvular means in the opposite direction, means for effecting an operative connection between said first and second pressure responsive means, and means including a movable fulcrum cooperating therewith for rendering said second named pressure responsive means effective or ineffective to control the operation of said valvular means.

7. The combination in a fluid pressure control valve having a casing provided with intake and exhaust valves and a pressure responsive member for controlling the operation of said valves, of a motor of a type exerting a substantially constant force having an element movable for operating said member, an operating lever for said member having a pivotal connection therewith and a pivotal connection with said motor element at a point spaced therefrom, and a movable fulcrum associated with said casing and lever and movable between said pivotal points thereon for varying the mechanical advantage of said lever and controlling the operation of said member by said motor element.

8. The combination in a fluid pressure control valve having a casing provided with intake and exhaust valves and a member for controlling the operation of the valves, of means responsive to the pressure delivered by said valve for actuating said member in one direction, means responsive to a substantially constant pressure for actuating said member in the opposite direction, an operating connection between said first and second pressure responsive means, and means associated therewith and movable relatively thereto for establishing a condition of balance between the forces exerted by said first and second named pressure responsive means when said first named pressure responsive means is subjected to a predetermined pressure.

9. The combination in a fluid pressure control valve having a casing provided with intake and exhaust valves and a pressure responsive member for controlling the operation of the valves, of a motor of a type exerting a substantially constant force for controlling the operation of said member, a lever for establishing an operative connection between said motor and member, and an operator controlled fulcrum element movable along said lever between the point of connection therewith to the motor and the point of connection therewith to the member for varying the force exerted on said member by said motor through said levers and correspondingly controlling the pressure delivered by said fluid pressure control valve.

10. The combination in a fluid pressure control valve having a casing provided with intake and exhaust valves and a pressure-responsive member for controlling the operation of the valves, of means for actuating said member including a motor for producing a substantially constant force, an element connecting said motor and member and having a non-yielding connection therewith, and movable means cooperating with said element and casing and serving as a movable fulcrum for said element for controlling the force transmitted to said member through said element.

11. The combination in a fluid pressure control valve having a casing provided with intake and exhaust valves and a pressure-responsive member for controlling the operation of the valves, of a fluid motor of the type producing a substantially constant force for actuating said member, an element connecting said member and motor for transmitting force from the motor to the member and having a non-yielding pivotal connection therewith, and movable means cooperating with said element and casing and serving as a movable fulcrum for said element for varying the force transmitted to said member by said element.

12. The combination in a fluid pressure control valve having a casing provided with intake and exhaust valves and a pressure-responsive member for controlling operation of the valves, of a precompressed spring for actuating said member, an element interconnected therebetween for transmitting the force exerted by said spring to said member and having a non-yielding pivotal connection with said member, and movable means cooperating with said element and casing and serving as a movable fulcrum for said element for controlling the force supplied to said member through said element.

13. The combination in a fluid pressure control system having a source of fluid pressure, a fluid pressure actuator, and valvular means for controlling the flow of fluid pressure therebetween, of means responsive to the pressure in said actuator for controlling the operation of said valvular means, a motor exerting a substantially constant force for controlling the operation of said valvular means, and means including a connecting element between said pressure-responsive means and motor and an operator-controlled member cooperating with said element and movable with respect thereto for effecting a balance of forces acting on said element regardless of the pressure acting on said first named pressure-responsive means.

ROGER H. CASLER.